US008798551B2

(12) United States Patent
Yuan et al.

(10) Patent No.: US 8,798,551 B2
(45) Date of Patent: Aug. 5, 2014

(54) METHOD AND SYSTEM FOR SPATIAL CSI FEEDBACK FOR COORDINATED MULTI-POINT PROCESSING (COMP)

(75) Inventors: Yifei Yuan, Livingston, NJ (US); David Huo, Newton, NJ (US)

(73) Assignees: ZTE (USA) Inc. (CN); ZTE Corporation, Richardson, TX (US)

( * ) Notice: Subject to any disclaimer, the term of this patent is extended or adjusted under 35 U.S.C. 154(b) by 271 days.

(21) Appl. No.: 13/310,348

(22) Filed: Dec. 2, 2011

(65) Prior Publication Data

US 2012/0178374 A1    Jul. 12, 2012

Related U.S. Application Data

(60) Provisional application No. 61/430,722, filed on Jan. 7, 2011.

(51) Int. Cl.
*H04B 1/00* (2006.01)
*H04B 7/00* (2006.01)

(52) U.S. Cl.
USPC ......... 455/69; 455/67.11; 455/67.13; 455/68; 455/522; 455/561; 455/24; 455/25; 375/358

(58) Field of Classification Search
USPC ......... 455/67.11, 67.13, 67.15, 67.16, 68, 69, 455/522, 561, 24–25, 63.1, 63.4; 375/358, 375/219–221
See application file for complete search history.

(56) References Cited

U.S. PATENT DOCUMENTS

| | | | | |
|---|---|---|---|---|
| 7,822,102 B2* | 10/2010 | Kent et al. | | 375/146 |
| 8,320,275 B2* | 11/2012 | Zhang et al. | | 370/252 |
| 8,351,524 B2* | 1/2013 | Zhou | | 375/260 |
| 8,379,705 B2* | 2/2013 | Mallik et al. | | 375/226 |
| 8,488,725 B2* | 7/2013 | Yuan et al. | | 375/346 |
| 8,542,589 B2* | 9/2013 | Surineni et al. | | 370/231 |
| 8,559,545 B2* | 10/2013 | Chen et al. | | 375/267 |
| 2006/0245513 A1* | 11/2006 | Koo et al. | | 375/267 |
| 2008/0080449 A1* | 4/2008 | Huang et al. | | 370/342 |
| 2008/0108310 A1* | 5/2008 | Tong et al. | | 455/69 |

* cited by examiner

*Primary Examiner* — Tuan A Tran

(74) *Attorney, Agent, or Firm* — Drinker Biddle & Reath LLP

(57) ABSTRACT

Spatial discrimination information is fed back at both the multi-antenna transmitter and the multi-antenna receiver connecting a UE and cells within a CoMP measurement set. With the UE feeding back the transmitter and the receiver side spatial discrimination information of each cell-to-UE connection, the composite spatial CSI over multiple sites/nodes can be determined. The approach is applicable for UEs with single or multiple receiving antennas, and the spatial discrimination information can be wideband long-term or sub-band short-term. In some embodiments, the spatial discrimination information at the receiver side is derived from the actual spatial channel while receiver implementation is taken into account. The spatial discrimination information at the transmitter and at the receiver can be fed back using codebooks for MIMO precoding.

19 Claims, 3 Drawing Sheets

Block diagram of an example spatial CSI feedback for CoMP.

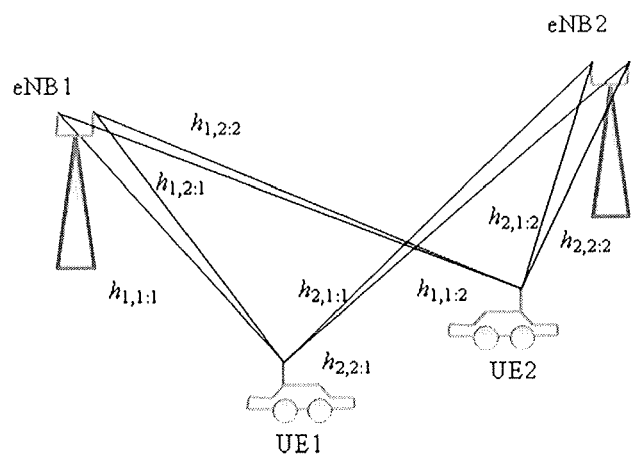
Figure 1. A simplistic model of a two-site CoMP

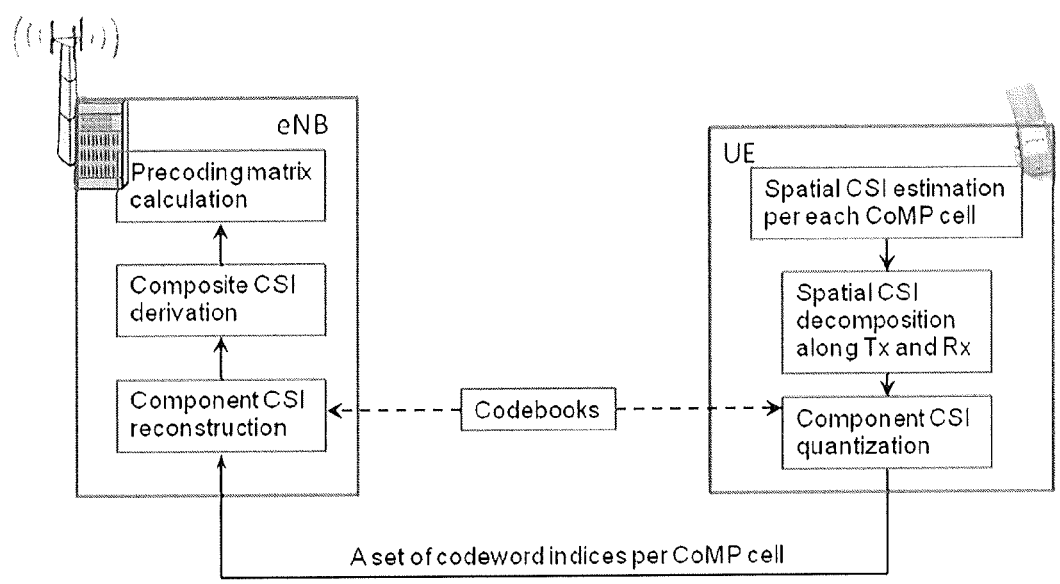
Figure 2. Block diagram of an example spatial CSI feedback for CoMP.

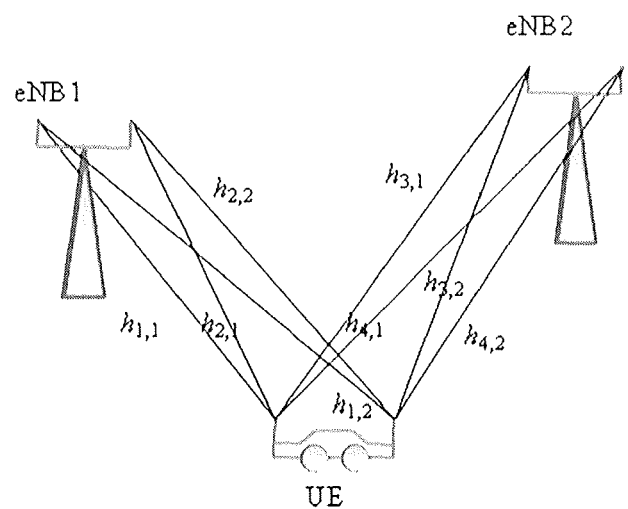
Figure 3. A CoMP scenario with two 2 Tx-antenna eNBs and a 2 Rx-antenna UE.

METHOD AND SYSTEM FOR SPATIAL CSI FEEDBACK FOR COORDINATED MULTI-POINT PROCESSING (COMP)

FIELD OF THE INVENTION

The present invention relates to a method and system for providing spatial channel state information (CSI) for the downlink communication with coordinated beamforming/scheduling or joint transmission over multiple cells/nodes. Specifically, the invention relates to spatial CSI feedback using multiple component CSIs, each represented by a codeword in an appropriate codebook.

BACKGROUND OF THE INVENTION

Multiple-input multiple-output (MIMO) employs multiple antennas at the transmitter and/or at the receiver to significantly improve the data throughput and transmission reliability. The data throughput can be increased at the link level and/or at the system level. Both spatial multiplexing and beamforming can be used to improve the spectral efficiency and the data throughput. Spatial multiplexing is very effective in boosting the link level throughput and the peak rate since it allows multiple data streams to be transmitted simultaneously to the same user through parallel channels. Spatial multiplexing is suitable when spatial correlation between antennas (both at the transmitter and the receiver) is low. Beamforming or precoding is able to boost the signal to interference plus noise ratio (SINR) of the channel, and thus the channel rate. Essentially, precoding involves applying proper weights over multiple transmit antennas and the weight calculation can be based on either channel reciprocity or via feedback.

MIMO has been extended to multi-cell operations, the so-called coordinated multi-point processing (CoMP), a key study item in LTE-Advanced as described in 3GPP TR 36.814, v2.0.0, "Further Advancements for E-UTRA, Physical Layer Aspects," March 2010. The concept is to take advantage of increased spatial dimensions by performing either coordinated beamforming/scheduling or joint transmission over multiple transmit antennas from neighboring cells/nodes. Coordinated beamforming/scheduling does not need to share the transmitted data among neighboring cells/nodes, thus its requirement for the backhaul is much lower. Joint transmission has more potential for the capacity improvement albeit with more burden on the backhaul.

Joint processing and coordinated scheduling/beamforming can be illustrated in a generic model as seen in FIG. 1 where the cooperating set consists of two neighboring base stations, namely, (evolved node B) eNB1 and eNB2. Two user equipment (UE) locations are denoted by UE1 and UE2, and are in the CoMP serving area. For simplicity (without losing the generality), each UE shown in FIG. 1 has only one receive antenna and each base station has two transmit antennas. The convention "$h_{i,j;u}$" is used to denote the complex coefficient of the channel connecting j-th antenna of i-th eNB and u-th UE, assuming single-path fast fading. Out of all combinations, there are a total of eight channel coefficients in this two-site CoMP.

In the case of joint transmission, data is available at both eNB1 and eNB2 to achieve the inter-site precoding gain. The transmit weight applied at j-th antenna of i-th eNB for u-th UE is denoted as "$w_{i,j;u}$". The optimum weight vector is chosen from the total candidate set $W_4$ (the subscript 4 means that each vector has four elements). One criterion can be maximizing the inner product of the weight vector and the channel vector for the same UE, or mathematically:

$$w_{u,JT} = \begin{bmatrix} w_{1,1;u} \\ w_{1,2;u} \\ w_{2,1;u} \\ w_{2,2;u} \end{bmatrix}_{JT} = \underset{w_{u,JT} \in W_4}{\operatorname{argmin}} \sum_{i,j=1}^{2} w_{i,j;u} h_{i,j;u} \qquad (1)$$

For multi-user joint transmission, UEs should be paired such that the co-channel interference can be minimized. That is as follows:

$$\{u1, u2\}_{pair, JT} = \underset{u1,u2 \in U}{\operatorname{argmin}} \sum_{i,j=1}^{2} w_{i,j;u1} w^*_{i,j;u2} \qquad (2)$$

In the case of coordinated scheduling/beamforming, user data is available only at the serving cell and there is no inter-site precoding gain. Transmit weight is chosen from the total candidate vector set $W_2$ (the subscript 2 means that each vector has two elements). One simple way would be (without jointly optimizing weight vectors between sites/nodes):

$$w_{u,CS/BF} = \begin{bmatrix} w_{u,1} \\ w_{u,2} \end{bmatrix}_{CS/BF} = \underset{w_{u,CS/BF} \in W_2}{\operatorname{argmax}} \sum_{j=1}^{2} w_{u,j} h_{u,j;u} \qquad (3)$$

Similar to multi-user joint transmission, UEs in CoMP area sharing the same resource need to be carefully paired in order to reduce the other cell interference. That is as follows:

$$\{u1, u2\}_{pair, CS/BF} = \underset{u1,u2 \in U}{\operatorname{argmin}} \sum_{j=1}^{2} w_{u1,j} w^*_{u2,j} \qquad (4)$$

The difference between coordinated scheduling and coordinated beamforming lies in the spatial correlation assumption between the transmit antennas on each eNB. Coordinated scheduling assumes widely spaced vertical or cross-polarized antennas, whereas coordinated beamforming implies highly correlated antenna array to actually form the physical beams in each cell.

The study item of CoMP will continue in Release 11. An important aspect of CoMP is the spatial channel state information (CSI) feedback. Given the different geometries experienced by each UE, especially at cell edges where CoMP is mostly targeted for, the number measurement sets for different UEs can have different number of cells. These and other circumstances present problems and obstacles that are overcome by the method and system of the present invention as hereinafter described.

SUMMARY OF THE INVENTION

In accordance with one aspect, the present invention comprises a method of feeding back spatial CSI of one or more spatial channels that connect one or more UEs and one or more cells comprising: measuring spatial CSI per channel, decomposing the spatial CSI per channel resulting in at least two component CSIs per channel, the first component CSI per channel characterizing spatial discrimination information at a corresponding transmitter, and the second component CSI per channel characterizing spatial discrimination information at a corresponding receiver; and feeding back the component CSIs per channel by the one or more UEs. Where each UE feeds back for each cell-UE connection the spatial discrimination information of both the transmitter and receiver, the network is able to determine the composite spatial CSI over multiple sites/nodes.

The present invention provides accurate spatial CSI feedback for CoMP in a flexible manner, while maintaining the backward compatibility with earlier LTE releases, e.g., Rel. 8/9/10 and as continued in future releases.

According to the present invention, the basic concept is to feed back the spatial discrimination information at both multi-antenna transmitter and the multi-antenna receiver, regarding the MIMO link, connecting the UE and the cell within CoMP measurement set. With the UE feeding back the transmitter and the receiver side spatial discrimination information of each cell-UE connection, the network can determine the composite spatial CSI over multiple sites/nodes. The invention is applicable to mobiles with single or multiple receiving antennas. The spatial discrimination information can be wideband long-term or subband short-term.

The spatial discrimination information at the receiver side is derived from the actual spatial channel (explicit feedback), for example singular value decomposition (SVD), while taking into account receiver implementation (implicit feedback). Implicit feedback assumes certain receiver processing and usually takes the form of precoding matrix indicator (PMI) or the enhanced versions. Explicit feedback attempts to directly capture the spatial channel characteristics without taking into account the receiver processing. The spatial channel is measured from the reference channels for channel state information (CSI-RS).

The spatial discrimination information at the transmitter and at the receiver is fed back using codebooks for MIMO precoding. Codebooks of earlier LTE releases, e.g., Rel-8/9/10, can be reused. Signal-to-noise ratio (SNR) related information such as eigenvalues of the spatial channel can be fed back using Rel-8/9/10 CQI, or the enhancements.

In accordance with the present invention, feedback is per cell (or eNB, or any low power node) for CoMP. Here, "per cell" means that each UE involved in CoMP operation measures the spatial channel connecting to each cell/node, effects the CSI decomposition and quantization. The UE can feedback the group of CSI through the uplink channels to its serving cell or, alternatively, feed back each CSI directly to the cell being measured.

In another aspect, the invention comprises a system for feeding back the spatial channel state information (CSI) of the spatial channel connecting each UE and each cell/node of a network which comprises providing at least one UE-receiver node and at least one transmitter cell for establishing a spatial channel connecting each UE-transmitter cell. Means are provided for measuring spatial CSI per channel and for decomposing each spatial channel into at least two component CSIs, the first component CSI characterizes the spatial discrimination information at the transmitter, and the second component CSI characterizes the spatial discrimination information at the receiver. Means are provided whereby each UE feeds back for each cell-UE connection the spatial discrimination information of both the transmitter and receiver so the network can determine the composite spatial CSI over multiple sites/nodes.

BRIEF DESCRIPTION OF THE FIGURES

FIG. 1 is a simplistic model of a two-site CoMP.
FIG. 2 is a block diagram of an example of spatial CSI feedback for CoMP.

FIG. 3 illustrates a CoMP scenario with two eNBs having two transmitting antennas and a single UE having two receiving antennas.

DETAILED DESCRIPTION OF THE INVENTION

The block diagram in FIG. 2 illustrates an example of the feedback setup of the present invention. There are two major entities in the setup, namely, eNB and UE. For presentation simplicity, only one eNB is shown in FIG. 2, even though it should be emphasized that the feedback generation process at the UE (CSI measurement, decomposition, and quantization) is per cell.

The spatial channel to each cell is measured via CSI-RS. Then spatial CSI decomposition is performed by separating the transmitter-side and receiver-side spatial discriminations, each being quantized via codebook. For each cell connection, there is a codebook index for transmitter-side spatial discrimination, and another codebook index for receiver-side spatial discrimination. In the case that the transmitter-side spatial discrimination information is too complicated to use only one index, the double index mechanism in LTE Release 10 DL MIMO can also be used as described in 3GPP TS 36.211, "Evolved Universal Terrestrial Radio Access (E-UTRA); Physical Channels and Modulation."

The spatial decomposition can be illustrated by reference to an example scenario in FIG. 3 where two base stations, eNB1 and eNB2, form a measurement set for the UE. Each eNB has two transmitting antennas and the UE has two receiving antennas.

As mentioned in the background section, the feedback is per cell because it provides more flexibility in CoMP operation in terms of the number of cells/antennas in the measurement set. Such flexibility facilitates codebook design. Accordingly, each MIMO channel connecting to eNB 1 and eNB2 (denoted as $H_1$ and $H_2$) is a singular value decomposed (SVD) represented as follows:

$$H_1 = \begin{bmatrix} h_{11} & h_{12} \\ h_{21} & h_{22} \end{bmatrix} = \begin{bmatrix} v_{11} & v_{12} \\ v_{21} & v_{22} \end{bmatrix} \begin{bmatrix} \lambda_{11} & 0 \\ 0 & \lambda_{22} \end{bmatrix} \begin{bmatrix} u_{11} & u_{12} \\ u_{21} & u_{22} \end{bmatrix} = V_1 \Lambda_1 U_1 \quad (5)$$

$$H_2 = \begin{bmatrix} h_{31} & h_{32} \\ h_{41} & h_{42} \end{bmatrix} = \begin{bmatrix} v_{31} & v_{32} \\ v_{41} & v_{42} \end{bmatrix} \begin{bmatrix} \lambda_{33} & 0 \\ 0 & \lambda_{44} \end{bmatrix} \begin{bmatrix} u_{31} & u_{32} \\ u_{41} & u_{42} \end{bmatrix} = V_2 \Lambda_2 U_2 \quad (6)$$

Matrices $V_1$ and $V_2$ represent the transmitter side spatial discriminations, while $U_1$ and $U_2$ reflect the receiver side spatial discriminations. SVD helps to eliminate very weak eigenmode thus reducing the signaling overhead compared to feeding back the spatial channel matrix directly. It is highly preferred to feed back both V and U in CoMP; otherwise, the network is not readily able to determine the composite spatial channel information across a CoMP measurement set.

While SVD is an efficient way to capture the spatial CSI, such "explicit" feedback does not reflect the receiver implementation which can be far different from what information theory would predict for optimum receiver. Essentially, SVD assumes:

1. Perfect knowledge of spatial CSI at the transmitter so that the precoding can be carried to maximize the signal power and minimize the cross-channel/user interference;
2. Joint decoder with perfect demodulation and channel coding at the receiver, so that the MIMO channel rate can be rewritten as the sum rate of each eigenmode of the spatial channel.

Accordingly, in the case where when the precoding and the receiver are not optimum, SVD may not be the best way to represent the channel. In this situation, the "U" matrix must be looked at more closely since it represents an "extra" feedback needed for CoMP compared to single-cell DL MIMO operation. As already noted, the "U" matrix is an attribute of the receiver. Its spatial discrimination capability is achieved by simply carrying out SVD on "H", or alternatively by other methods and means known to those skilled in the art. For example, with a single codeword minimum mean squared error (MMSE) linear receiver, the spatial discriminator, e.g., the MMSE spatial filter of a 2-by-2 matrix, takes a different form than the "U" matrix.

According to the invention, there is provided an operational framework for CSI feedback: decompose the spatial channel into "VAU" form, while allowing flexibility to come up with "U". The implementation of "U" also takes into account codebook design, including the resolutions, structures and the like. This is in contrast to the pure explicit feedback schemes described in 3GPP TS 36.211, "Evolved Universal Terrestrial Radio Access (E-UTRA); Physical Channels and Modulation"; and 3GPP, R1-094217, "Feedback in support of downlink CoMP: General views", Qualcomm Europe, RAN1#58bis, Miyazaki, Japan, October 2009. These references do not consider the receiver side implementation. The feedback of "U" is either long-term wideband or short-term sub-band. The system aspect of the present invention employs microprocessors known to those skilled in the art and programmed to carry out the new and unobvious methods of the present invention. Thus steps including measuring, quantizing, decomposing and feeding back are readily carried out according to the present invention based on the description herein.

Many modifications and alterations of the new methods and systems described herein may be employed by those skilled in the art without departing from the spirit and scope of the invention which is limited only by the claims.

The invention claimed is:

1. A method of feeding back spatial CSI of one or more spatial channels, the spatial channels connecting one or more UEs and one or more cells, the method comprising:
    measuring spatial CSI per channel;
    decomposing the spatial CSI per channel, resulting in at least two component CSIs per channel, the first component CSI per channel characterizing spatial discrimination information at a corresponding transmitter, and the second component CSI per channel characterizing spatial discrimination information at a corresponding receiver; and
    feeding back the component CSIs per channel by the one or more UEs.

2. The method of claim 1, wherein the component CSIs per channel are represented as one of a vector or a matrix.

3. The method of claim 1, wherein the decomposing comprises matrix multiplication.

4. The method of claim 1, further comprising:
    quantizing the at least two component CSIs per channel using at least one codebook, resulting in at least two corresponding indices per channel; and feeding back the at least two corresponding indices per channel.

5. The method of claim 4, wherein the at least two corresponding indices are one of long-term wideband; short-term subband; and both long-term wideband and short-term subband.

6. The method of claim 1, further comprising
    deriving spatial CSIs per channel while accounting for corresponding receiver implementation.

7. The method of claim 6, wherein the deriving comprises singular value decomposition (SVD).

8. The method of claim 1, wherein the feeding back the component CSIs per channel comprises using one or more codebooks for MIMO precoding.

9. The method of claim 1, further comprising determining, by a network, composite spatial CSI by using the component CSIs per channel.

10. A system for feeding back spatial channel state information (CSI) of each spatial channel connecting each UE and each cell/node of a network to determine a composite spatial CSI comprising:
    at least one UE and at least one cell for establishing a spatial channel connection between each UE and each cell;
    means for decomposing the spatial CSI into at least two component CSIs, the first component CSI characterizes the spatial discrimination information at the transmitter, and the second component CSI characterizes the spatial discrimination information at the receiver; and
    means for feeding back the spatial discrimination information of both the transmitter and the receiver of each connection so the network can determine the composite spatial CSI.

11. The system of claim 10, further comprising means for representing the component CSIs for each channel as a vector or a matrix.

12. The system of claim 10, wherein the means for decomposing is configured for matrix multiplication.

13. The system of claim 10, further comprising:
    means for quantizing the at least two component CSIs for each channel using at least one codebook, resulting in at least two corresponding indices for each channel; and
    means for feeding back the at least two corresponding indices for each channel.

14. The system of claim 13, wherein the at least two corresponding indices are one of long-term wideband; short-term subband; and both long-term wideband and short-term subband.

15. The system of claim 10, further comprising means for deriving spatial CSIs for each channel while accounting for receiver implementation.

16. The system of claim 15, wherein the means for deriving is configured for singular value decomposition (SVD).

17. The system of claim 16 wherein a microprocessor is configured for singular value decomposition (SVD).

18. The system of claim 16 wherein (SVD) is represented by the following equations $$\begin{array}{l} H_1 = \begin{bmatrix} h_{11} & h_{12} \\ h_{21} & h_{22} \end{bmatrix} = \begin{bmatrix} v_{11} & v_{12} \\ v_{21} & v_{22} \end{bmatrix} \begin{bmatrix} \lambda_{11} & 0 \\ 0 & \lambda_{22} \end{bmatrix} \begin{bmatrix} u_{11} & u_{12} \\ u_{21} & u_{22} \end{bmatrix} = V_1 \Lambda_1 U_1 \\ H_2 = \begin{bmatrix} h_{31} & h_{32} \\ h_{41} & h_{42} \end{bmatrix} = \begin{bmatrix} v_{31} & v_{32} \\ v_{41} & v_{42} \end{bmatrix} \begin{bmatrix} \lambda_{33} & 0 \\ 0 & \lambda_{44} \end{bmatrix} \begin{bmatrix} u_{31} & u_{32} \\ u_{41} & u_{42} \end{bmatrix} = V_2 \Lambda_2 U_2 \end{array}.$$

19. The system of claim 10, wherein the means for feeding back is configured to use one or more codebooks for MIMO precoding.

* * * * *